(No Model.)
H. K. SANDELL.
MECHANICAL MOVEMENT.
No. 584,408.  Patented June 15, 1897.
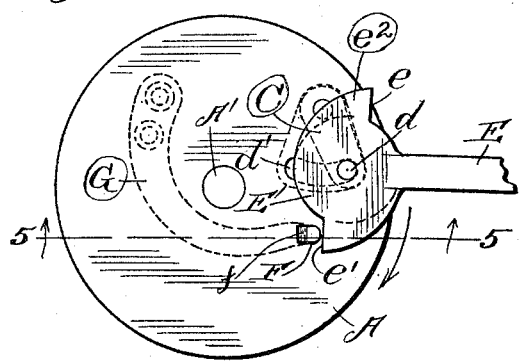
Fig. 1.
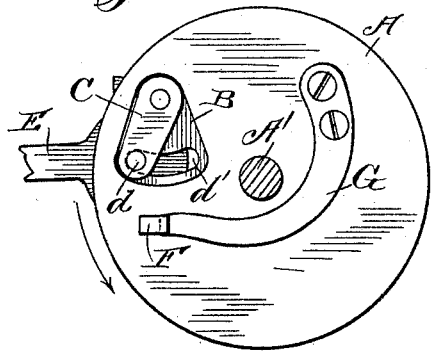
Fig. 2.
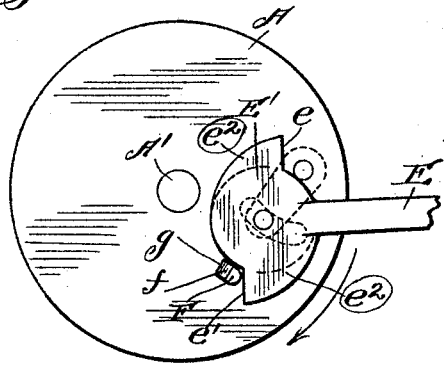
Fig. 3.
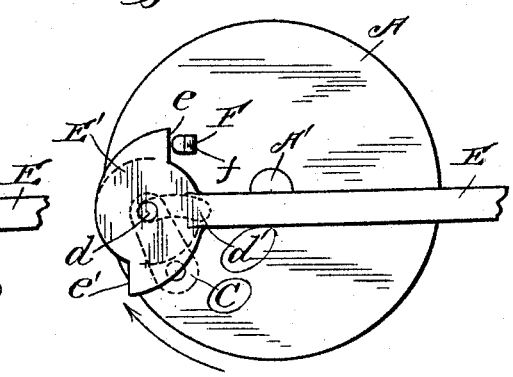
Fig. 4.
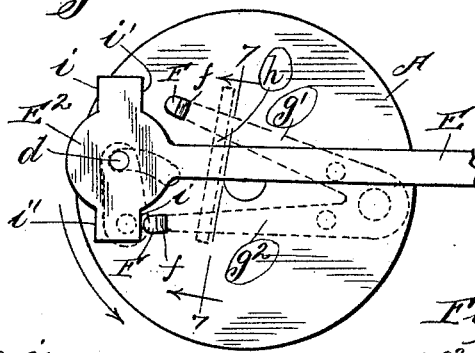
Fig. 6.
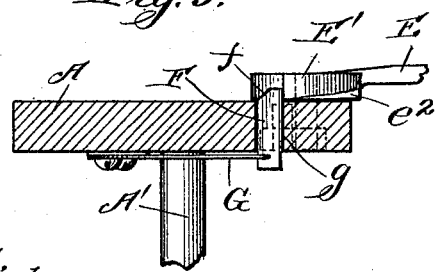
Fig. 5.
Fig. 7.
Witnesses:
W. J. Jacker.
E. A. Duggan.
Inventor:
Henry K. Sandell.
By Chas. C. Tillman
Atty.
THE NORRIS PETERS CO., PHOTO-LITHO., WASHINGTON, D. C.

UNITED STATES PATENT OFFICE.

HENRY K. SANDELL, OF CHICAGO, ILLINOIS.

MECHANICAL MOVEMENT.

SPECIFICATION forming part of Letters Patent No. 584,408, dated June 15, 1897.

Application filed April 12, 1897. Serial No. 631,820. (No model.)

*To all whom it may concern:*

Be it known that I, HENRY K. SANDELL, a citizen of the United States, residing at Chicago, in the county of Cook and State of Illinois, have invented certain new and useful Improvements in Mechanical Movements, of which the following is a specification.

This invention relates to a mechanical movement for overcoming what are termed "dead-centers" and for converting a reciprocating motion to rotary motion, or vice versa; and it consists in certain peculiarities of the construction, novel arrangement, and operation of the various parts thereof, as will be hereinafter more fully set forth, and specifically claimed.

The objects of my invention are to provide a mechanical movement of simple and inexpensive construction which may be used for various kinds of machinery and which by reason of the peculiar construction and operation of its parts will overcome the dead-centers incident to the ordinary crank movements, and to provide such a movement in which the crank wheel or disk may be rotated in either direction.

In order to enable others skilled in the art to which my invention pertains to make and use the same, I will now proceed to describe it, referring to the accompanying drawings, in which—

Figure 1 is a face view of a crank wheel or disk and a portion of a pitman to drive the same and embodying my invention. Fig. 2 is a similar view of like parts, but of the reverse side or face. Fig. 3 is a face view showing the parts in different positions from that illustrated in Figs. 1 and 2. Fig. 4 is a similar view showing still other positions of the parts. Fig. 5 is a plan sectional view taken on line 5 5 of Fig. 1. Fig. 6 is a face view of the crank-disk and a portion of the pitman, illustrating a modification in the construction of the parts; and Fig. 7 is a sectional view taken on line 7 7 of Fig. 6.

Similar letters refer to like parts throughout the different views of the drawings.

A represents a crank wheel or disk, which is fixed on a shaft A', which shaft may be used for transmitting power for different purposes and to various kinds of machinery. The crank disk or wheel is provided in one of its surfaces, near its periphery, with a recess B, which is preferably segmental in shape, as shown. Within the recess B is pivoted at one of its ends a radius link or arm C, which is provided near its other end with a wrist-pin $d$, which extends through a curved slot $d'$, formed in the disk and located in the enlarged portion of the recess B. Secured on the other end of the wrist-pin $d$ is a pitman E, which is formed or provided around its secured portion with a cam-shaped head E', the upper and lower portions of which are provided with straight edges $e$ and $e'$, respectively, and said portions, as shown, are at right angles to the body of the pitman. The surface of the head E' adjacent to the crank disk or wheel is slightly rounded or beveled, as at $e^2$, (shown by dotted lines in Fig. 3 and by continuous lines in Fig. 5 of the drawings,) which shape permits the head E' to ride over the pin F, whose end adjacent to the head E' is formed with a bevel $f$ or rounded portion. The pin or projection F operates in an opening $g$ in the disk A and is actuated by a spring G, which may be curved, as is shown, and is secured to the surface of the disk on the opposite side thereof from the pitman-head, which prevents their interference.

In Figs. 6 and 7 of the drawings I have shown a modification which consists in employing the disk A, formed with the recess B and slot $d'$, and the pivoted radius-link C, with a pin $d$ to operate in the slot $d'$, as before stated; but in this modification the pitman E is provided with a head E² of a different shape from that shown in Figs. 1 to 5, inclusive, and above described, and instead of using a spring with a single arm I employ one having two arms $g'$ and $g^2$, on the free ends of which are secured pins or projections F, having the beveled ends $f$ on their portions adjacent to the pitman-head, said pins passing through openings in the disk.

The construction illustrated in the modification is used to enable the disk or crank-wheel to be rotated in either direction, and to accomplish this one of the pins F must be retracted within its opening in the disk so that it will not engage with the pitman-head, and for this purpose I employ a sliding block $h$, which is held in position on the disk by means of lugs $h'$ or otherwise and has its ends beveled, as at $h^2$, to allow one of the springs to be thrown and held outwardly from the disk, as shown in Fig. 7. In this modification the surface of the pitman-head $E^2$ adjacent to the disk may be beveled or rounded, so as to ride over the projecting end of either of the pins F, which pins will contact with the straight edges $i$ or $i'$, as the case may be, at the proper time.

The operation of my device is as follows: In the rotation of the crank wheel or disk the spring G will press the pin F through the opening $g$ until the beveled end $f$ of said pin protrudes through the face of the disk, and when in the position shown in Fig. 1 of the drawings the power of the pitman will be applied to the pin F, and as the disk continues to rotate the pin will be retracted by reason of the rounded or beveled portion $e^2$ of the pitman-head, with which portion it contacts, and will be held out of engagement with the straight edges of the head until it reaches the position shown in Fig. 4 of the drawings, at which time the power of the pitman will be again transferred to the pin F by reason of it being pressed forward by means of the spring G, so that it will contact with the straight edge $e$ and off the dead-center, as will be clearly understood by reference to Figs. 1, 3, and 4 of the drawings. The same operation will be performed by the use of the modification illustrated in Figs. 6 and 7 of the drawings, and it is apparent that either of the arms $g'$ and $g^2$, carrying the pins F, may be held away from the disk, so that its pin will be withdrawn from contact with the straight edges of the pitman-head, thus allowing the wheel to be rotated in either direction.

Having thus fully described my invention, what I claim as new, and desire to secure by Letters Patent, is—

1. The combination of a revolving shaft, with a crank disk or wheel secured thereto and having a curved slot near its periphery, a radius link or arm pivotally secured at one of its ends on the disk, and having at its other end a wrist-pin extending through said slot, a cam-shaped pitman-head provided with straight edges secured on the wrist-pin, and having portions of its surface adjacent to the disk beveled or rounded, a spring-actuated pin located in an opening in the disk near the said slot, and having its projecting end beveled and adapted to contact with the pitman-head, and to engage the straight edges thereof, substantially as described.

2. The combination of a revolving shaft, with a crank disk or wheel secured thereto, and having in one of its surfaces a recess, and a curved slot located in said recess, a radius link or arm pivotally secured at one of its ends in the recess, and having on its other end a wrist-pin extending through the slot, a cam-shaped pitman-head having straight edges, and portions of its surfaces adjacent to the disk rounded or beveled and secured on the wrist-pin, a spring-actuated pin located in an opening in the disk and having its projecting end beveled, said pin being located near the slot in the disk and adapted to contact with the beveled or rounded portions of the pitman-head and to engage with the straight edges thereof, substantially as described.

HENRY K. SANDELL.

Witnesses:
CHAS. C. TILLMAN,
E. A. DUGGAN.